United States Patent
Fury

(10) Patent No.: US 6,528,973 B2
(45) Date of Patent: Mar. 4, 2003

(54) VOLTAGE-LIMITING REGULATOR FOR USE WITH AN AC GENERATOR HAVING DC-EXCITED FIELDS

(76) Inventor: Robert Fury, 81 Pickerel Rd., Monroe, NY (US) 10950

( * ) Notice: Subject to any disclaimer, the term of this patent is extended or adjusted under 35 U.S.C. 154(b) by 0 days.

(21) Appl. No.: 09/765,283

(22) Filed: Jan. 22, 2001

(65) Prior Publication Data

US 2002/0097024 A1 Jul. 25, 2002

(51) Int. Cl.$^7$ ............................ H02H 7/06; H02P 11/00; H02P 9/00
(52) U.S. Cl. ............................ 322/28; 322/24; 322/25; 322/26
(58) Field of Search ............................ 322/28, 25, 15, 322/29

(56) References Cited

U.S. PATENT DOCUMENTS

| | | | | |
|---|---|---|---|---|
| 3,982,173 A | | 9/1976 | Berry et al. ............ | 323/17 |
| 4,013,938 A | * | 3/1977 | McCoy .................. | 307/82 |
| 4,442,396 A | * | 4/1984 | Hucker .................. | 322/21 |
| 4,800,291 A | | 1/1989 | Bowers .................. | 307/87 |
| 4,852,540 A | * | 8/1989 | Safranek ................ | 123/149 D |
| 4,992,920 A | * | 2/1991 | Davis ..................... | 322/32 |
| 5,262,704 A | * | 11/1993 | Farr ....................... | 318/434 |
| 5,448,154 A | * | 9/1995 | Kanke et al. .......... | 322/22 |
| 5,519,600 A | * | 5/1996 | Ahladas ................. | 307/58 |
| 5,554,923 A | * | 9/1996 | Maddali et al. ....... | 322/25 |
| 5,617,011 A | | 4/1997 | Hammer et al. ....... | 322/28 |
| 5,642,033 A | * | 6/1997 | Bartol et al. .......... | 322/25 |
| 5,656,922 A | | 8/1997 | LaVelle et al. ........ | 322/46 |
| 5,675,237 A | | 10/1997 | Iwatani .................. | 322/28 |
| 5,686,819 A | | 11/1997 | Iwatani et al. ........ | 322/25 |
| 6,215,271 B1 | * | 4/2001 | Lerow et al. .......... | 320/104 |

* cited by examiner

Primary Examiner—Nestor Ramirez
Assistant Examiner—Julio C. Gonzalez
(74) Attorney, Agent, or Firm—Siemens Patent Services, LC

(57) ABSTRACT

The present invention features a voltage-limiting regulator for use with an AC generator having DC-excited fields. The AC output voltage from the generator is sensed and compared to a fixed reference representative of the sensed difference is amplified and applied to the DC field excitation input of the AC generator. As the DC voltage supplied to the field varies, the AC output voltage from the generator may be held constant under varying load conditions. The voltage-limiting regulator is particularly useful for vehicle-mounted, high power, single phase AC generators.

14 Claims, 6 Drawing Sheets

VOLTAGE-LIMITING REGULATOR FOR USE WITH AN AC GENERATOR HAVING DC-EXCITED FIELDS

BACKGROUND OF THE INVENTION

1. Field of the Invention

The present invention relates to a voltage limiting regulator. More particularly, the invention comprises a voltage limiting regulator for use cooperatively with an alternator having split, DC-excited fields and wherein the voltage output from the alternator may be controlled by varying the DC-excitation voltage provided to the field windings.

The need for portable, compact, high-power AC electric power generators is widely felt. Not only are such devices useful for powering the tools in the field away from normal AC supply mains, they are particularly useful for providing emergency power during time that AC power is unavailable from the power grid. Vehicle-mounted AC generators have proven to be particularly useful because of the ease with which they may be transported to a job site or other location in need of locally-generated, AC power.

2. Description of the Prior Art

U.S. Pat. No. 3982,173 for AC-DC VOLTAGE REGULATOR, issued Sep. 21, 1976 to Clyde Raymond Berry, et al. teaches an AC-to-DC convertor employing a rectifier and a crowbar type voltage regulator. A control voltage is developed and fed back to a current-controlled switch which functions to maintain a constant output voltage from the converter under varying loads.

In contradistinction, the inventive regulator is designed for use with an alternator producing a single-phase AC output voltage and using DC excitation of its field windings. The applied DC excitation voltage may be varied thereby varying the AC output voltage from the alternator. The voltage limiting regulator circuit senses a changing AC output voltage and responds by changing the DC excitation voltage thereby maintaining a substantially constant AC output voltage under a varying load.

U.S. Pat. No. 4,800,291 for ELECTRONIC CIRCUIT FOR CONTROL OF A VOLTAGE REGULATOR OF AN ELECTRICAL GENERATOR, issued Jan. 24, 1989 to Jack K. Bowers discloses an apparatus for synchronizing the voltage and phase of an AC generator to an existing power grid. Unlike the voltage-limiting regulator of the instant invention, BOWERS uses sophisticated electronic circuitry to accomplish the synchronization function. The inventive regulator, on the other hand, is intended for application with stand-alone AC generators, each driving a varying load. The phase of each individual generator is essentially constant. Consequently, there is no need to match its phase to that of any other generator. The output voltage of a generator using the inventive regulator is controlled as the load applied to the generator changes.

U.S. Pat. No. 5,617,011 for METHOD AND SYSTEM FOR LIMITING GENERATOR FIELD VOLTAGE IN THE EVENT OF REGULATOR FAILURE, issued Apr. 1, 1997 to Kathleen M. Hammer, et al. teaches a circuit for limiting the field voltage provided a generator in the event of a field coil short circuit or regulator failure. Nothing in HAMMER, et al. teaches the regulation of an AC generator's output voltage using a rectified feedback signal, a comparitor and an output stage to directly provide a varying DC field energization voltage to the generator.

U.S. Pat. No. 5,656,922 for VEHICLE BASED AC POWER SYSTEM, issued Aug. 12, 1997 to William J. LaVelle, et al. teaches a hybrid AC generator utilizing both permanent magnets and DC-driven coils for field generation. The field coils may be arranged in switchable buck or boost modes to control the alternator output, thereby preventing an overvoltage output. The LaVELLE, et al. apparatus allows designing a vehicle-mounted alternator capable of full output at any range of engine speeds, from idle to full throttle.

The inventive regulator, on the other hand, is designed to provide a continuously varying DC voltage for excitation of the field windings of a conventional (i.e., not a hybrid) alternator whereby the AC output voltage is maintained substantially constant under varying load conditions.

U.S. Pat. No. 5,675,237 for OUTPUT CONTROL DEVICE FOR VEHICLE AC GENERATOR, issued Oct. 7, 1997 to Shiro Iwatani discloses a switching arrangement which allows utilization of a single alternator for selectively charging a vehicle's battery and providing a high-voltage AC output for powering an external load. Unlike the inventive regulator, there is no teaching of a voltage regulation function based upon changing the DC voltage applied to the alternator for field excitation.

U.S. Pat. No. 5,686,819 for CONTROL APPARATUS FOR AC GENERATOR OF MOTOR VEHICLES, issued Nov. 11, 1997 to Shiro Iwatani, et al. also teaches a switching arrangement for directing alternator output to a vehicle battery or, in a second mode of operation, to an external AC load. There is still no teaching of a voltage regulation function based upon changing the DC voltage applied to the alternator for field excitation.

None of the above inventions and patents, taken either singly or in combination, is, however, seen to anticipate or suggest the instant invention as claimed.

SUMMARY OF THE INVENTION

The present invention relates to a voltage-limiting regulator for use with an AC generator having DC-excited fields. The AC output voltage from the generator is sensed and compared to a fixed reference voltage. An algebraic difference voltage, representative of the sensed difference, is amplified and applied to the DC field excitation input of the AC generator. As load changes, the AC output voltage from the generator varies. By sampling the generator's AC output voltage, a feedback voltage is developed which is supplied to the generator's field windings. In this way the AC output voltage is held constant under varying load conditions. The voltage-limiting regulator is particularly useful for vehicle-mounted, high power, single phase AC generators.

Accordingly, it is a principal object of the invention to provide a voltage-limiting regulator for use with an AC generator having DC-excited fields.

It is another object of the invention to provide a voltage-limiting regulator for use with an AC generator having DC-excited fields which provides a substantially constant generator output under varying load conditions.

It is a further object of the invention to provide a voltage-limiting regulator for use with an AC generator having DC-excited fields which provides a substantially constant generator output under varying load conditions by changing a DC excitation voltage supplied to the field-generating mechanism.

Still another object of the invention is to provide a voltage-limiting regulator for use with an AC generator having DC-excited fields which uses a comparitor to provide a feedback voltage which is derived from the algebraic comparison of the instantaneous AC output voltage from the AC generator and a fixed, predetermined reference voltage.

An additional object of the invention is to provide a voltage-limiting regulator for use with an AC generator having DC-excited fields which allows the construction of high-power, single phase AC generators which are capable of maintaining essentially constant output voltage under varying load conditions.

It is again an object of the invention to provide a voltage-limiting regulator for use with an AC generator having DC-excited fields which allows the construction of high-power, single phase AC generators which are suitable for mounting on a motor vehicles.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

The present invention relates to a voltage limiting regulator for use in conjunction with an AC alternator having DC-excited field. The terms alternator and generator have been used interchangeably herein.

Figure 1:
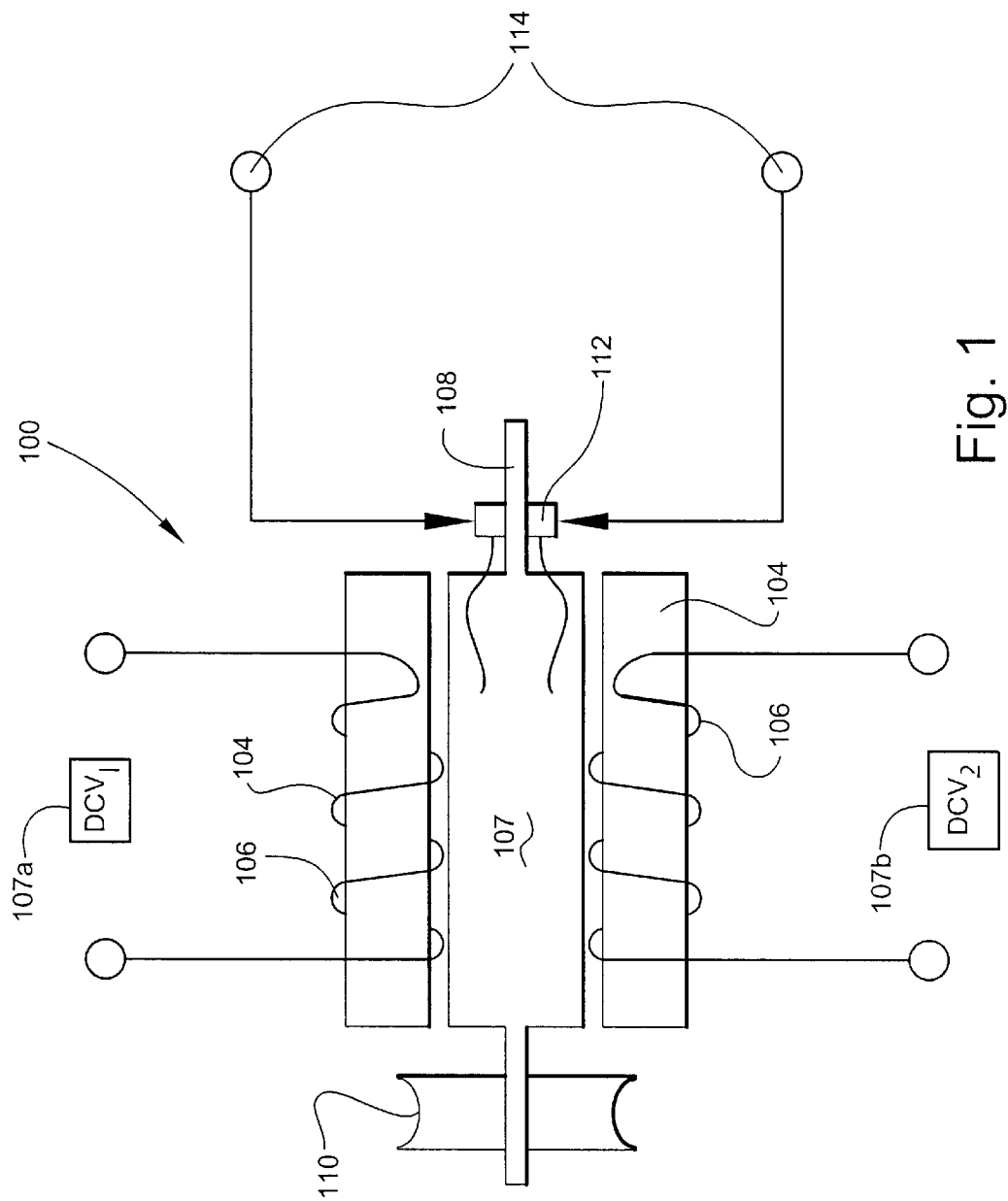
FIG. 1 is schematic, cross-sectional view of an AC generator suitable for use with the voltage-limiting regulator of the invention.

Referring first to FIG. 1, there is shown a schematic cross-sectional view of an alternator suited for use with the voltage limiting regulator of the invention, generally at reference number 100. An armature 102 is located between at least two independent field producing elements 104 on either side of armature 102. Each field-producing element 104 is shown having a coil 106 which is connected to an external voltage sources DCV1 and DCV2 107a, and 107b, respectively. Both sets of field producing elements 104 may be powered either independently or in parallel as operating circumstances dictate. A shaft 108 extends beyond both distal ends of armature 102. A pulley 110 on a first distal end of shaft 108 allows for the connection of alternator 100 to an external prime mover (not shown). A set of slip rings 112 at a second distal end of shaft 108 allows for the transfer of the generated AC voltage from armature 102 to an external AC bus 114. Any alternator configuration, many of which are well known to those of skill in the art, may be used with the regulator of the present invention. This assumes, of course, that the alternator's field is produced from externally-applied DC voltage sources 107a and 107b (FIG. 1).

Figure 2:
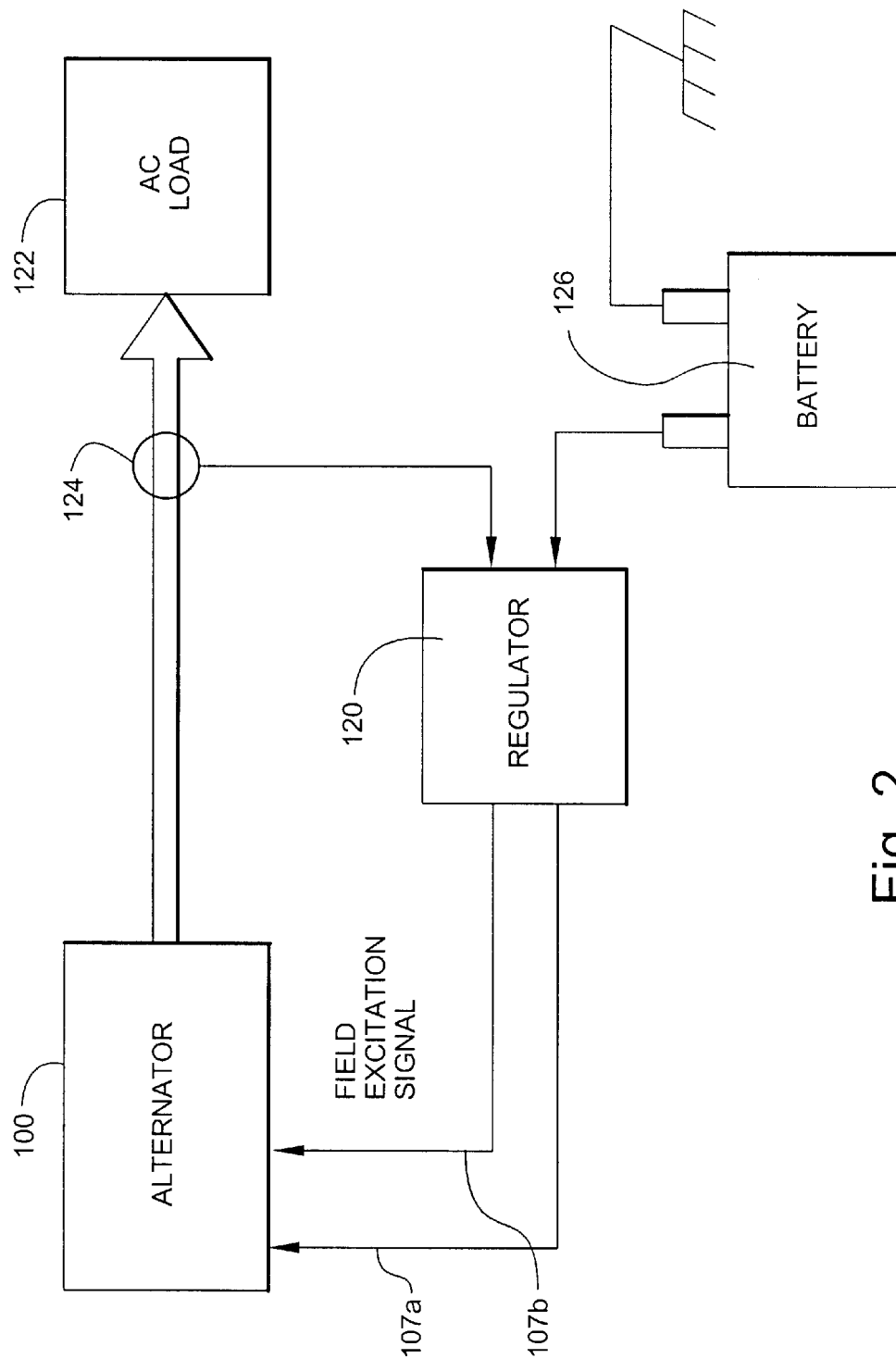
FIG. 2 is a system block diagram of the regulator of the invention connected to a suitable AC generator.

Referring next to FIG. 2, there is shown a schematic block diagram of a system including the inventive voltage limiting regulator 120 and an alternator 100 (FIG. 1). An external AC load 122 is connected to AC bus 114. An AC pickup 124 monitors the voltage and/or current at AC bus 114. The function of AC pickup 124 may be performed by a number of devices well known to those of skill in the art. These devices may be either directly connectable to AC bus 114 or, in alternate embodiments, may be inductively coupled devices such as current probe, hall effect devices, or the like. The invention is not considered limited by the device chosen for implementing AC pickup 124. AC pickup 124 is connected to an input of regulator 120. An external battery 126 is also connected to regulator 120. At least one output from regulator 120 is connected to alternator 100 and DC voltages from sources 107a and, optionally, 107b are thereby supplied.

Figure 3:
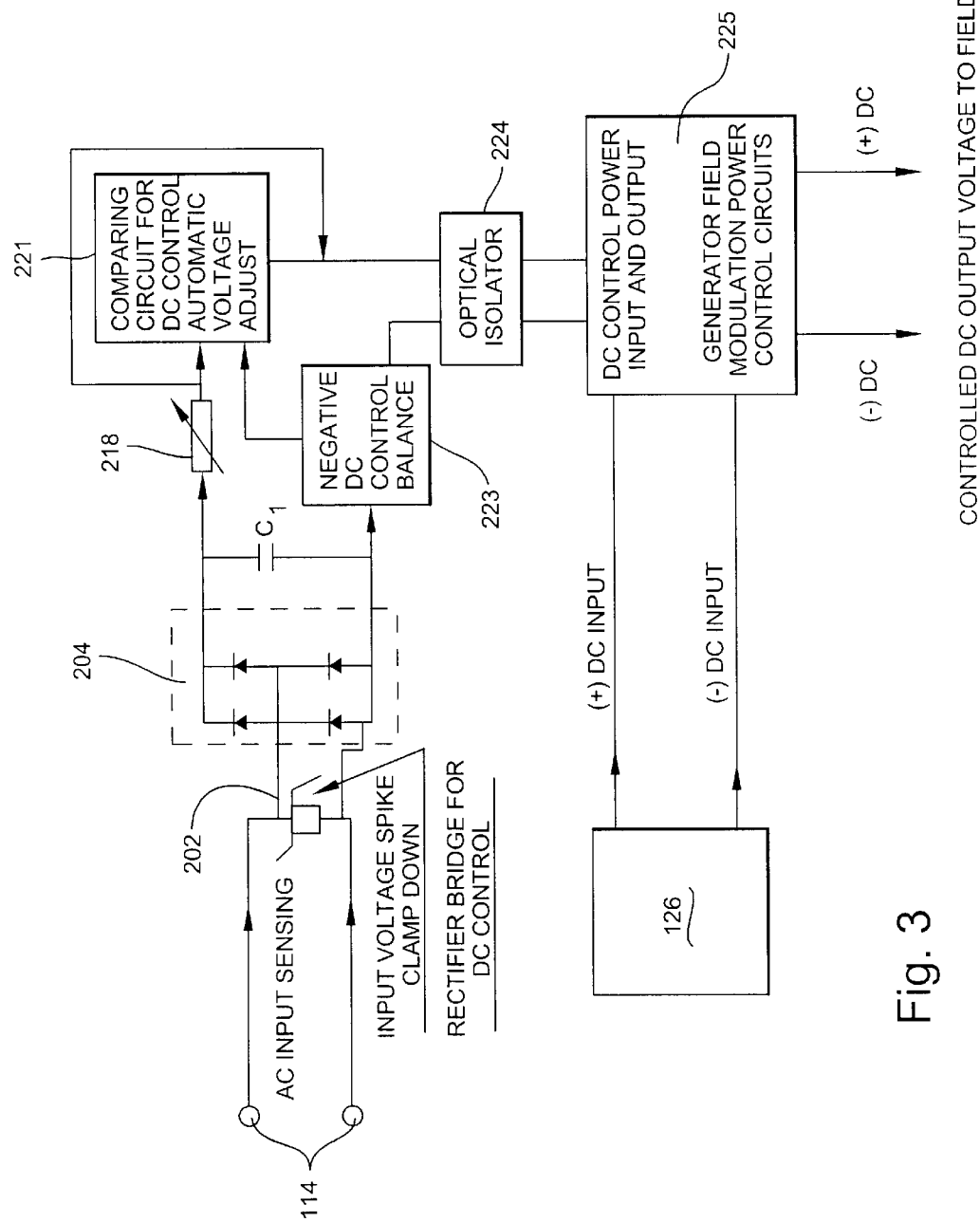
FIG. 3 is a more detailed system block diagram of the inventive regulator.

Referring next to FIG. 3, there is shown a slightly more detailed schematic diagram of the regulator 120 of the present invention in its operating environment. An AC sense voltage is taken at AC bus 114 related to the actual output of the alternator 100 and is clamped by a varistor VR-1 115 or other similar spike-suppressing device well know to those skilled in the art. A bridge rectifier 204 provides a time-varying DC voltage related to the AC input voltage at AC bus 114. A DC set-point control potentiometer 218, connected to a first input of a voltage comparitor circuit 221, is used to adjust the desired AC output voltage from the alternator being controlled. A negative DC balance control 223, feeds from the negative DC output of bridge rectifier 204 and is connected to a second input of comparitor circuit 221, in effect providing a stable reference voltage to the comparitor 221. The output of comparitor 221 is coupled through an optical isolator 224 and to an output controller 225. Output controller 225 accepts a DC input voltage from a battery 126 (FIG. 1) or similar DC voltage source. Output controller 225 then provides a time-varying DC output voltage responsive to the output of comparitor circuit 221 whereby the output of the controlled alternator 100 is held substantially constant at a voltage determined by set point control potentiometer 218. A detailed description of one embodiment of the inventive regulator 120 is provided Referring now to FIGS. 4b and 4c, there are shown two portions of an electrical schematic diagram of voltage-limiting regulator 120 (FIG. 2), generally at reference number 200. AC bus 114 is bridged by a surge suppressor 202 (FIG. 3) such as a varistor or similar device, and then connected to a bridge rectifier arrangement 204. A smoothing capacitor C1 206 is connected at the output of bridge rectifier 204 and a DC voltage bus 208 is established. The DC voltage on DC voltage bus 208 is typically in the range of 350 VDC. A zener diode 210, is connected to DC voltage bus 208 through voltage divider resistors 214, to the base of a regulator transistor 212. The regulated output voltage is typically in the range of 24 volts DC.

A second voltage divider network is formed by resistors 216, potentiometer 218 and resistor 220 is also connected to DC voltage bus 208. The output from the second voltage divider network is typically in the range od 5 volts DC.

A comparitor 222 has a first input connected to regulator transistor 212 and a second input connected to the pick-off point of the voltage divider network formed by resistors 216, potentiometer 218, and resistor 220. In the embodiment chosen for purposes of disclosure, resistive element 218 is a potentiometer which allows adjustment of a voltage feed to comparitor 222. This adjustable voltage ultimately controls the output voltage of the AC generator which is in the approximate range of 110–130 Volts AC in the preferred embodiment. The output of comparitor 222 is connected to an isolator 224, typically an optical isolator. A variety of devices suitable for use as an isolator are well known to those skilled in the circuit design art.

Figure 4A:
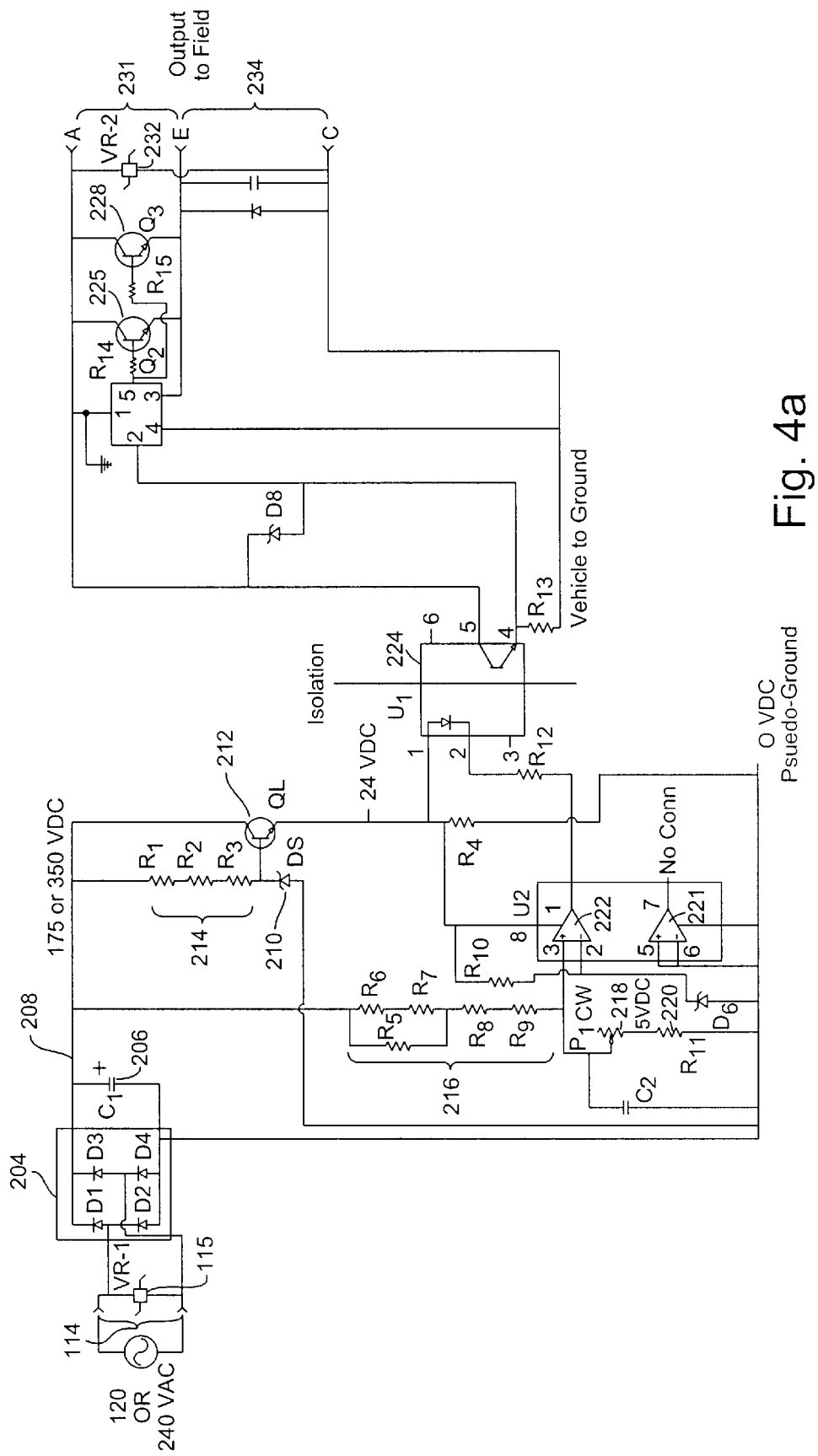
FIG. 4a is an overview schematic diagram showing the relationship of schematic diagram portions 4b and 4c.
Figure 4B:
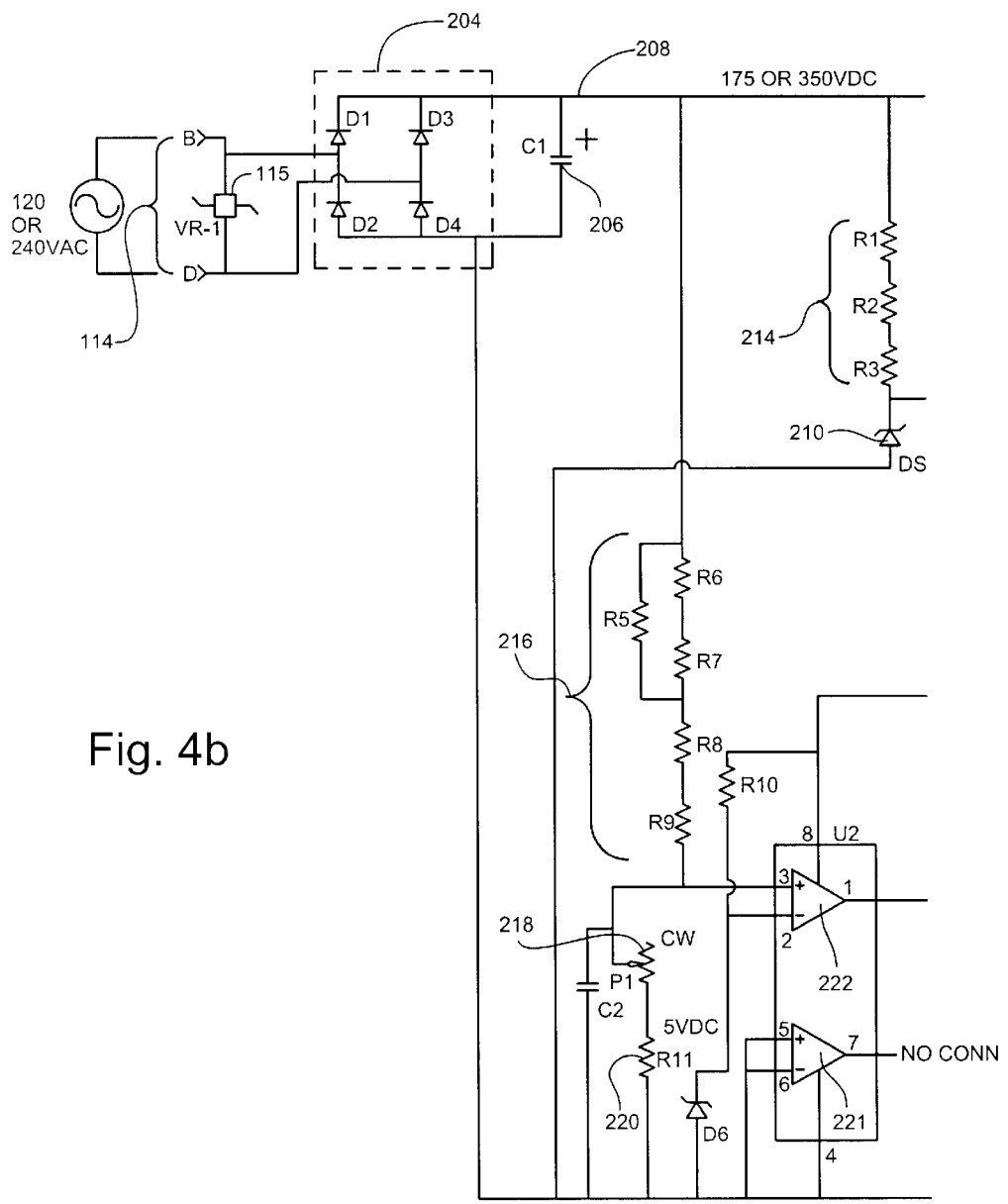
FIG. 4b is a first section of a schematic diagram of the preferred embodiment of the inventive regulator.
Figure 4C:
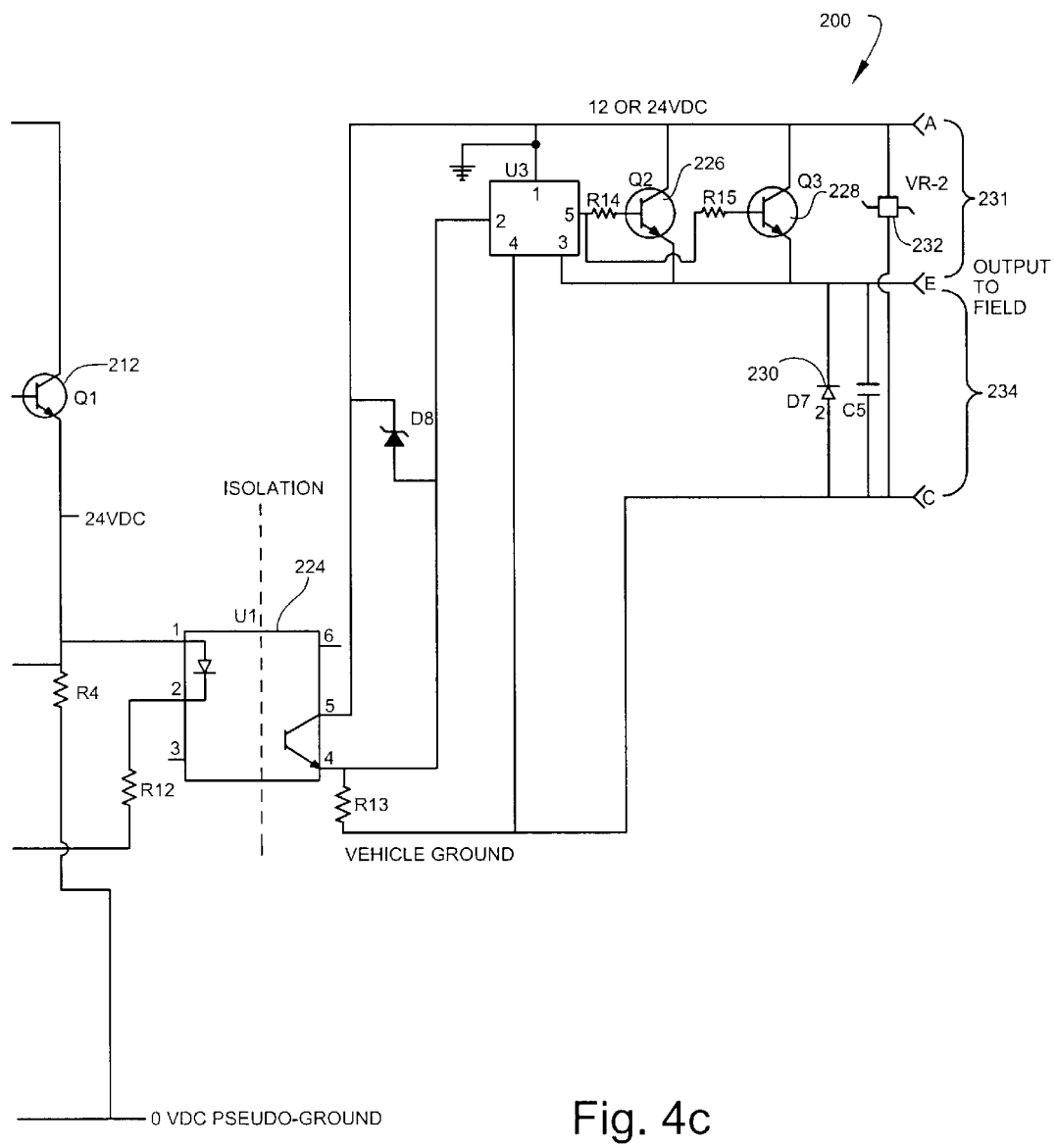
FIG. 4c is a second section of a schematic diagram of the preferred embodiment of the inventive regulator.

A pair of output power devices 226, 228 are connected to the output of isolator 224. Typically, devices 226, 228 are MOSFETs. Flyback diode 230 is connected to devices 226, 228. A second surge suppressor 232 is connected across DC output buses 231 (formed by nodes A and E), and 234 (formed by nodes E and C) as shown by FIGS. 4a and 4c which are connected to the field excitation inputs of alternator 100 (FIG. 2).

In operation, an AC voltage in the range of either 120–130 or 220–240 volts, depending upon the specific configuration, is applied to the input of regulator circuit 200 from AC bus 114. The AC voltage is dependant upon the alternator configuration selected. This applied AC voltage supplies an input sensing voltage, the exact voltage depending upon the configuration. Surge suppressor 202 is designed to clamp down the input sensing voltage thereby removing spikes which may be present thereupon. The DC output from bridge rectifier 204, appearing on DC voltage bus 208, will typically be in the range of 180 volts DC for a 120 volt AC input and 350 volts DC when 220 volts AC is applied.

The combination of resistors 214, zenar diode 210 and regulator transistor 212 from a voltage regulator providing a fixed, stable DC voltage for use as a supply voltage for comparitor 220. In the embodiment chosen for purposes of disclosure, approximately 24 volts DC has been chosen as the supply voltage. It should be obvious to those of skill in the art that other supply voltages could be chosen and obtained by varying component values.

The second voltage divide network (i.e., resistors 216, potentiometer 218, etc.) are used to develop a reference voltage for comparitor 222. The embodiment chosen for purposes of disclosure, the reference voltage is approximately 5 volts DC. Potentiometer 218 may be used to adjust the ultimate nominal AC output voltage of alternator 100. In the embodiment chosen for purposes of disclosure, potentiometer 218 can vary the nominal output voltage in a range of approximately 110–130 volts AC, assuming that the 120 volt configuration has been selected. A similar range of output voltage adjustment is also available in the 220 volt configuration. It will also be obvious to those of skill in the circuit design art that other reference voltage values could be chosen to meet a particular operating requirement.

Comparitor 222 is supplied a fixed, reference voltage at a first input and a portion of the rectified DC sense voltage at a second input. When the sense input drops below the reference voltage (e.g., 5 volts DC), the output of comparitor 222 shifts from its nominal "high" signal level to a "low" signal level. This causes a "high" signal to be applied to output transistors 226, 228. The output of comparitor 222 is isolated from the remainder of the output circuitry by isolator 224. This prevents the relatively high output voltages from reaching the low-voltage portions of the regulator circuitry in the event of circuit failure. In addition, isolator 224 minimizes the possibility of electrical shock to the user.

In the embodiment chosen for purposes of disclosure, the DC output voltage may assume a range of approximately 4 VDC to 14.4 VDC thereby allowing the output voltage of alternator 100 be held constant under a wide range of loads.

It is to be understood that the present invention is not limited to the embodiments described above, but encompasses any and all embodiments within the scope of the following claims.

What is claimed is:

1. A voltage-limiting regulator apparatus for use with an AC generator having a DC-excited field, comprising:
   a) AC voltage sensing means for sensing a signal representative of said AC output voltage;
   b) rectifying means operatively connected to said AC voltage sensing means for receiving said AC sensing signal and generating a DC sense voltage signal representative thereof;
   c) reference voltage means operatively connected to said rectifying means for generating a fixed, DC reference voltage from said DC sense voltage signal;
   d) comparing means, operatively connected to said reference voltage means, for generating a comparitor output voltage related to the difference between said DC sense voltage and said DC reference voltage; and
   e) output transistor means for providing a DC output voltage related to said comparitor output voltage;
   whereby a DC output voltage is applied to said AC generator such that an AC output voltage from said AC generator is held substantially constant regardless of the load applied thereto.

2. The voltage-limiting regulator apparatus as recited in claim 1, wherein said AC sensing means comprises at least one from the group: direct electrical connection to said AC output of said AC generator, and an indirect pickup inductively coupled to said AC output of said AC generator.

3. The voltage-limiting regulator apparatus as recited in claim 2, further comprising clamping means operatively connected to said AC output of said AC generator whereby voltage spikes on said AC output are reduced to a value below a predetermined threshold.

4. The voltage-limiting regulator apparatus as recited in claim 3, wherein said clamping means comprises a varistor.

5. The voltage-limiting regulator apparatus as recited in claim 1, further comprising:
   f) isolator means operatively connected between said comparing means and said output transistor means.

6. The voltage-limiting regulator apparatus as recited in claim 5, wherein said isolator means comprises an optical isolator.

7. The voltage-limiting regulator apparatus as recited in claim 1, wherein said AC output voltage is one from the group: approximately 125 volts and approximately 220 VAC.

8. The voltage-limiting regulator apparatus as recited in claim 7, wherein said AC output voltage is held to within approximately +5 volts.

9. The voltage-limiting regulator apparatus as recited in claim 1, wherein said fixed DC reference voltage signal is an approximately 5 volt DC voltage.

10. The voltage-limiting regulator apparatus as recited in claim 1, wherein said output transistor means comprises at least one MOSFET power transistor.

11. The voltage-limiting regulator apparatus as recited in claim 10, wherein said at least one MOSFET power transistor comprises a pair of cascaded MOSFET power transistors.

12. The voltage-limiting regulator apparatus as recited in claim 10, wherein said output transistor means further comprises a flyback diode to protect said at least one MOSFET power transistor from transient voltage spikes.

13. The voltage-limiting regulator apparatus as recited in claim 10, wherein said DC output voltage is applied to at least one field energization connection on said AC generator.

14. A method for regulating the output of an AC generator having a DC-excited field, the steps comprising:

a) providing an AC generator producing an AC output voltage for driving a load;

b) sensing said AC output voltage and producing an AC sense signal representative thereof;

c) rectifying said AC sense signal to produce a DC sense signal representative thereof and applying said DC sense signal to a first input of a comparitor;

d) providing a constant DC reference voltage to a second input of a comparitor;

e) performing an algebraic comparison of said constant DC reference voltage and said DC sense signal and providing an output voltage signal representative thereof;

f) amplifying said output signal to generate an amplified output signal; and g) applying said amplified output signal to at least one field excitation input of said AC generator;

where said AC output of said AC generator is held substantially constant when said load attached to said AC output varies.

* * * * *